United States Patent [19]

Yamamoto et al.

[11] Patent Number: 4,609,854
[45] Date of Patent: Sep. 2, 1986

[54] CONTROL DEVICE FOR A HOSPITAL BED

[75] Inventors: Hitoshi Yamamoto; Masaya Kurita, both of Kanagawa, Japan

[73] Assignee: Fuji Electric Company Ltd., Kawasaki, Japan

[21] Appl. No.: 697,406

[22] Filed: Feb. 1, 1985

[51] Int. Cl.$^4$ .......................... G05D 23/00; H02P 3/00
[52] U.S. Cl. ......................................... 318/471; 5/453; 318/334
[58] Field of Search .................. 5/453, 449, 450, 448, 5/452; 318/471, 473, 472, 334; 361/25, 27; 297/DIG. 3, DIG. 8, DIG. 1, 456, 458

*Primary Examiner*—William M. Shoop, Jr.
*Assistant Examiner*—Patrick C. Keane
*Attorney, Agent, or Firm*—Finnegan, Henderson, Farabow, Garrett & Dunner

[57] ABSTRACT

A sensor is provided in a hospital bed having a bed-mat made of movable particles. This sensor is to detect an excessive bead temperature in the case of a controller malfunction and to control the operation of a cooler. In the sensor, the circuit is so designed that an air compressor runs intermittently with the aid of timers while the sensor performs its functions at a temperature above the predetermined temperature level. The sensor also enables the compressor to run again when the temperature of the mat lowers to a level where a normal operation is possible to assure temperature control of the bed-mat even in the case of controller malfunctions.

10 Claims, 6 Drawing Figures

CONTROL DEVICE FOR A HOSPITAL BED

FIELD OF THE INVENTION

This invention relates to an operation control device for a hospital bed having a bed-mat containing fine particles movable under the force of compressed air.

BACKGROUND OF THE INVENTION

In a bed having a bed-mat containing fine, movable particles, the temperature of air to be fed to suspend the particles in the mat increases due to adiabatic compression by a compressor. For this reason, a temperature sensor is usually included to detect the temperature of the mat and to send an output signal to a temperature controller. The controller operates a cooler fan motor in accordance with the temperature of the mat to maintain the temperature of compressed air to be supplied into the mat at a constant level.

This system, however, has been inconvenient where the ambient temperature abruptly rises or where the cooler or the controller is inoperable because of failure or malfunction. In these cases, a particle temperature can easily exceed a predetermined temperature and present a serious problem for a patient lying on the bed.

For this reason conventional devices have required an additional sensor which is operable at a temperature beyond the predetermined level. This additional sensor controls the operation of the compressor, the fan motor and other devices to prevent the mat temperature from rising further and eventually lowers the temperature to a correct level. This structure, however, also suffers from shortcomings. When the supply of compressed air stops with the operation of the additional sensor, the mat surface holds a particular surface shape corresponding to the patient's body. The surface shape is vulnerable and unstable, however, when the patient on the bed moves and the distribution of the load of the patient is shifted on the mat.

Another defect is that the control function remains inoperable even after the mat temperature falls to a level where the temperature control should run again. Also, it is difficult to identify the cause of operation failure, i.e., whether it is due to an abrupt increase of ambient temperature or to the malfunction of the sensor or the temperature controller.

OBJECTS AND SUMMARY OF THE INVENTION

An objective of the present invention is a more reliable control device for hospital beds.

Another object of the present invention is a control device for hospital beds which maintains all bed features even in the case of the malfunction or failure of the temperature controller or other components.

A further object of the present invention is a control device for hospital beds which detects an abnormal condition, initiates corrective measures, and resumes normal operation when the abnormal condition is corrected.

To achieve these and other objects, a control device includes a sensor provided in a bed to detect an excessive bed temperature in the case of a controller malfunction and to control the operation of a cooler. The control device is designed to operate a compressor intermittently with the aid of timers while the sensor performs its functions. Where the mat temperature lowers to a level where normal operation is possible, the compressor again becomes controlled by a temperature controller.

BRIEF DESCRIPTION OF THE DRAWING

The manner in which the above and other objects, features, and advantages of the present invention are attained will become more apparent from the following detailed description when considered in view of the drawings, wherein.

DETAILED DESCRIPTION

Figure 1:
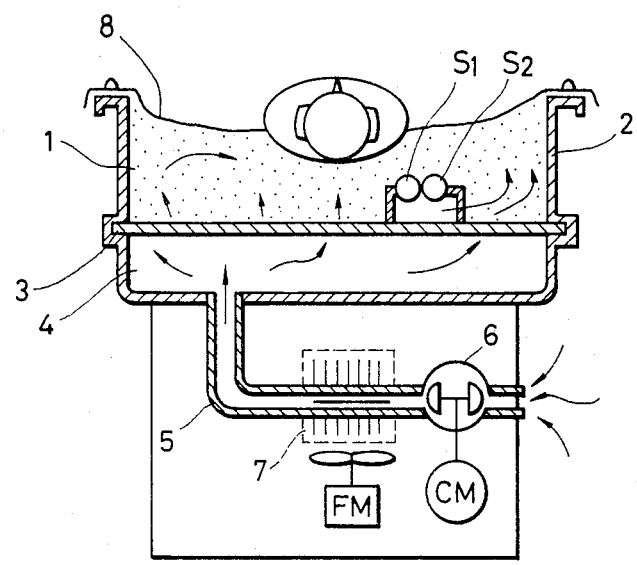
FIG. 1 is a cross section illustrating a first embodiment of the control device of the present invention.

FIG. 1 shows a bed wherein a tank 2 contains fine particles, approximately 50 microns in diameter, coated with silicon resin or a like material (hereinafter "beads"). An air chamber 4 is formed at the lower part of the tank 2 with a partition of a diffuser board 3 which has a number of very small air holes. The air chamber 4 is supplied with compressed air through an air duct 5 from a compressor 6, for example a ring type compressor. The air duct 5 is provided with a cooler 7 to cool air to be supplied to the tank 2.

In the case where air is supplied by the compressor 6 to the air chamber 4, the supplied air is dispersed through the diffusion board 3 into the tank to cause the beads in the tank to move around and upward. The bed is then ready for actual use upon the application of a bed cover sheet.

Figure 2:
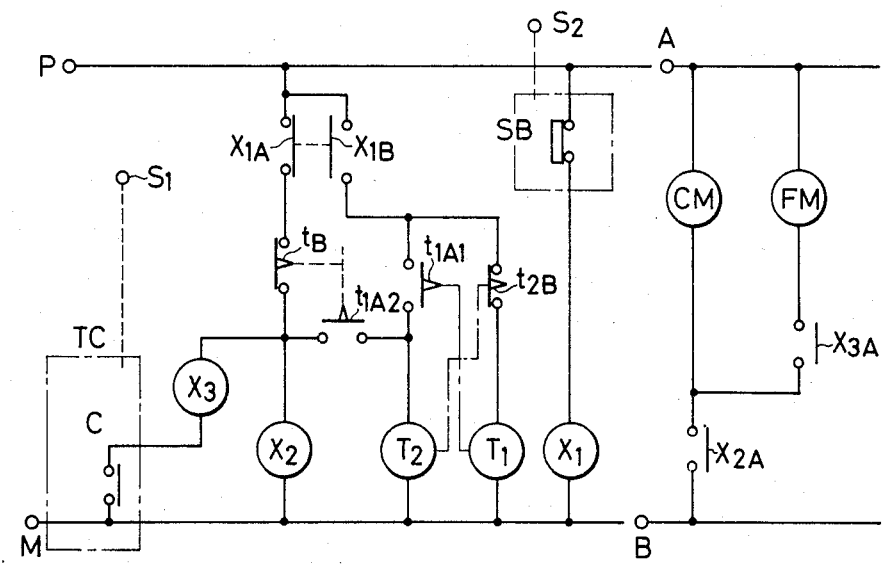
FIG. 2 is an electrical circuit diagram of the control device of FIG. 1.
Figure 3:
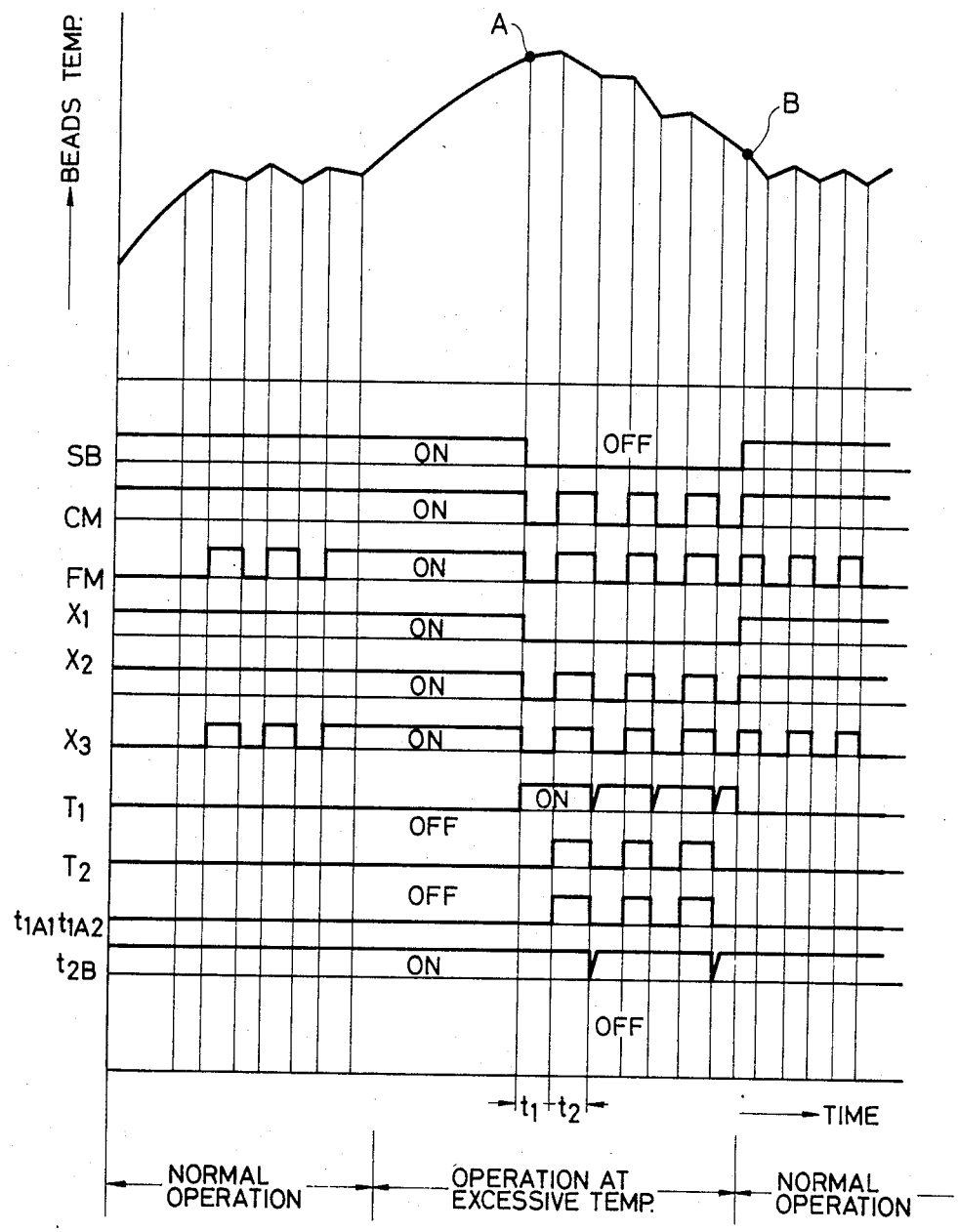
FIG. 3 is a timing diagram for illustrating the operation of the circuit of FIG. 2.

FIG. 2 shows a circuit diagram of a first embodiment of the control device according to the present invention and FIG. 3 shows a timing diagram illustrating the temperature control operation of the device. In these figures, CM is a motor for driving the compressor 6. FM is a fan motor for blowing air over the cooling fins in the cooler 27. TC is the temperature controller having a sensor S1 and a contact C.

The sensor S1 is provided in the tank 2 as shown in FIG. 1 to detect the temperature of the beads. The contact C is turned on and off within a comparatively narrow desirable temperature band in accordance with the specific temperature detected by the sensor S1.

X1, X2, and X3 are relays. T1 and T2 are timers. A and B are AC power terminals while P and M are DC power supply terminals for providing DC power to timers T1 and T2 as well as to the relays X1, X2, and X3. S2 is a sensor within the tank 2 for detecting the temperature A which is higher than the critical temperature to be detected by the sensor S1. SB is a contact which is turned off when the sensor S2 detects a temperature exceeding the critical level. SB is turned on when a temperature B, having a level substantially equal to the desirable temperature, is detected.

When SB is on, the contact and the relay X1 connected in series with each other are connected across the DC power terminals P and M. The timer T1 is connected through the B contact X1B of the relay X1 and through the B contact t2B of the timer T2. The series connection of the contact t1A1 of the timer T1 and the timer T2 is connected in parallel with the series connection of the contact t2B and the timer T1. The contact X1A of the relay X1, the contact t1B of the timer T1, and the relay X2 are connected in series across the terminals P and M, and the connection point between the contact t1B of the timer T1 and the relay X2 is connected to the point t1A2 between the contact t1A1 and the timer T2. The connection point between the contact t1B and the relay X2 is further connected to the terminal M via the connection point between the relay X3 and the contact C of the temperature controller TC. The compressor motor CM is connected in series with the contact X2A and one end of the series connection of the fan motor FM. The contact X3A is connected to the connection point of the contact X2A.

In operation, the sensor S2 when detecting a small excessive temperature is not in the operable state in the normal mode and the contact SB is on to cause the relay X1 to be magnetized. The relay X2 is magnetized and the contact X2A is on, i.e., closed. Under this condition, the compressor motor CM runs continuously. The fan motor FM runs and stops alternately with the aid of the relay X3 because the contact C repeatedly elects ON and OFF according to the temperature controller TC. Thus, the continuous movement of beads in the tank is assured and the bead temperature is controlled to a desirable level.

In the case where the bead temperature exceeds the desired level due to a sudden increase in the ambient temperature, the sensor S2 detects a small excessive temperature rise, starts operating, and causes the contact SB to open, i.e., turn off. The relay X1 is demagnetized and the contact X1A turns off. Also, the relays X2 and X3 are demagnetized. The compressor motor CM and the fan motor FM do not receive AC power at this stage and stop operation and the timer T1 is energized to start timer counting. The controller contact remains on because the bead temperature is high.

During counting by the timer T1, the contacts t1A1 and t1A2 turn on to cause the timer T2 to be energized for the start of timer counting. The relays X2 and X3 are magnetized to close the circuit for a period between the counting completion by the timer T1 and the timer T2, the compressor motor CM and the fan motor FM start running to cause the movement of beads in the tank.

Assuming that the time period for demagnetizing the relays X2 and X3 is t1, which is also the period of counting of the timer T1, and that the time for their magnetization is t2, which is also the period of counting of the timer T2, a ratio of the intermittent operation of the compressor motor CM can be expressed by $t2/(t1+t2)$. Generally, the bead temperature goes down during t1 because the compressor motor is off.

The contact t2B is turned off upon the completion of counting by the timer T2 to cause the timer T1 to be deenergized and the contacts t1A1 and t1A2 to be off. The timer T2 is deenergized and the contact t2B is set on again to cause the timer T1 to the energized. Upon completion of the counting by the timer T1, the contacts t1A1 and t1A2 are again set on. A repetition of these operations causes the temperature of the beads 1 to be gradually lowered as shown in the diagram of FIG. 3. When the bead temperature reaches the point B at which the sensor S2 starts detecting temperature differences, the contact SB of the sensor 52 turns on and temperature control by the temperature controller TC is again available In the case of excessive ambient temperature rise, temperature control of the beads can be accomplished in the manner as described above. The fan motor may be operable continuously in some cases during the timer operation. In such a case the circuit should be modified to allow the relay X3 to be magnetized simultaneously with the demagnetization of the relay X1. This modification assumes the direct control of the fan motor FM.

Even where normal operation is not possible due to the failure of the temperature controller TC or the cooler, the intermittent operation of the compressor motor and the fan motor FM can be maintained with the function of the timers. This operation maintains the bead temperature band within the band between point A and the point B of FIG. 3. Thus, the previously mentioned defects are eliminated.

According to the present invention, a sensor to detect temperature differences has a circuit configuration for temporarily and intermittently operating the compressor by using timers. This circuit further enables the compressor to return to the original operation mode under the control of the temperature controller TC when the bead temperature goes down and reaches the temperature (point A) at which the sensor S2 again starts operating. Therefore, the bead movement can be assured by the intermittent operation of the compressor even in the case of a failure of the cooler 7 or the temperature controller TC. This operation continues the flexibility of the mat to adjust the mat surface to changes in a patient's body position.

The control device of the present invention also functions properly in the situation where the temperature control is temporarily disabled due to an abrupt ambient temperature rise. To be more specific, the sensor detecting temperature differences operates in this case to cause the device to operate in the intermittent operation mode. When the temperature falls to a desirable level, the device returns to the normal mode operated by the temperature controller TC. Thus, the patient can be free from adverse physical influences from the bed even in the case of malfunction or failure of a component of the bed.

Figure 4:
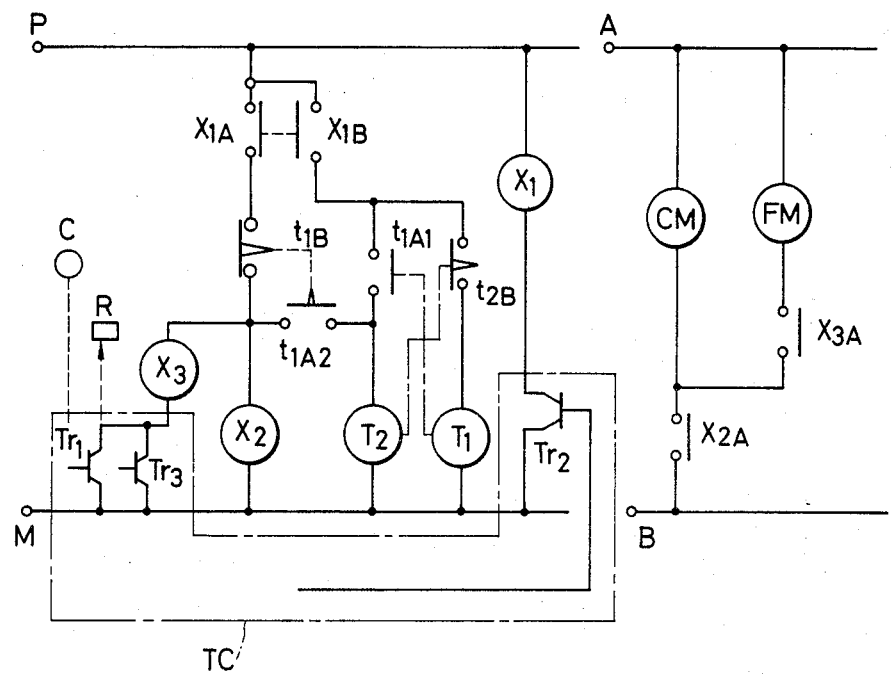
FIG. 4 is an electrical circuit diagram of a second embodiment of the control device of the present invention.

FIG. 4 shows an electrical circuit diagram of a second embodiment of the control device according to the present invention. In this figure, CM is the compressor motor to drive the compressor 6. FM is the fan motor for circulating air around the cooling fins of the cooler 7. TC is a temperature controller for controlling the temperature of the beads in the tank 2. The controller TC controls operation of the fan motor FM.

Tr1 is a transistor for the controller TC and C is a sensor to detect the temperature of the beads in the tank 2. The output signal from the sensor C is sent to the controller TC. X1, X2 and X3 are relays, T1 and T2 are timers, A and B are AC power terminals, and P and M are DC power terminals.

Tr2 is a transistor. which is turned on while the temperature controller TC is in the normal state. Tr2 is turned off in the event of failure or malfunction of the temperature controller TC. The relay X1 is connected in series to the transistor Tr2.

The timer T1 is connected across the terminals P and M through the "b" contact X1B of the relay X1 and the "b" contact t2B connected in series with the timer T2. The series connection of the "a" contact t1A1 of the timer T1 and the timer T1 is connected in parallel with the series connection of the contact t2B and the timer T1.

The "a" contact X1A of the relay X1, the contact t1B of the timer T1, and the relay X2 are connected in series and this series connection is connected across the terminals P and M. The connection point between the contact t1B of the timer T1 and the relay X2 is connected through a contact t1A2 of the timer T1 to the connection point between the contact t1A1 and the timer T2. The connection point between the contact t1B and the relay X2 is connected to the terminal M via the parallel-connected transistors Tr1 and Tr3. The compressor motor CM is connected in series with the relay contact X2A, and the fan motor FM and the contact X3A, connected in series with each other, are connected to the connection point between the compressor motor CM and the contact X2A.

Figure 5:
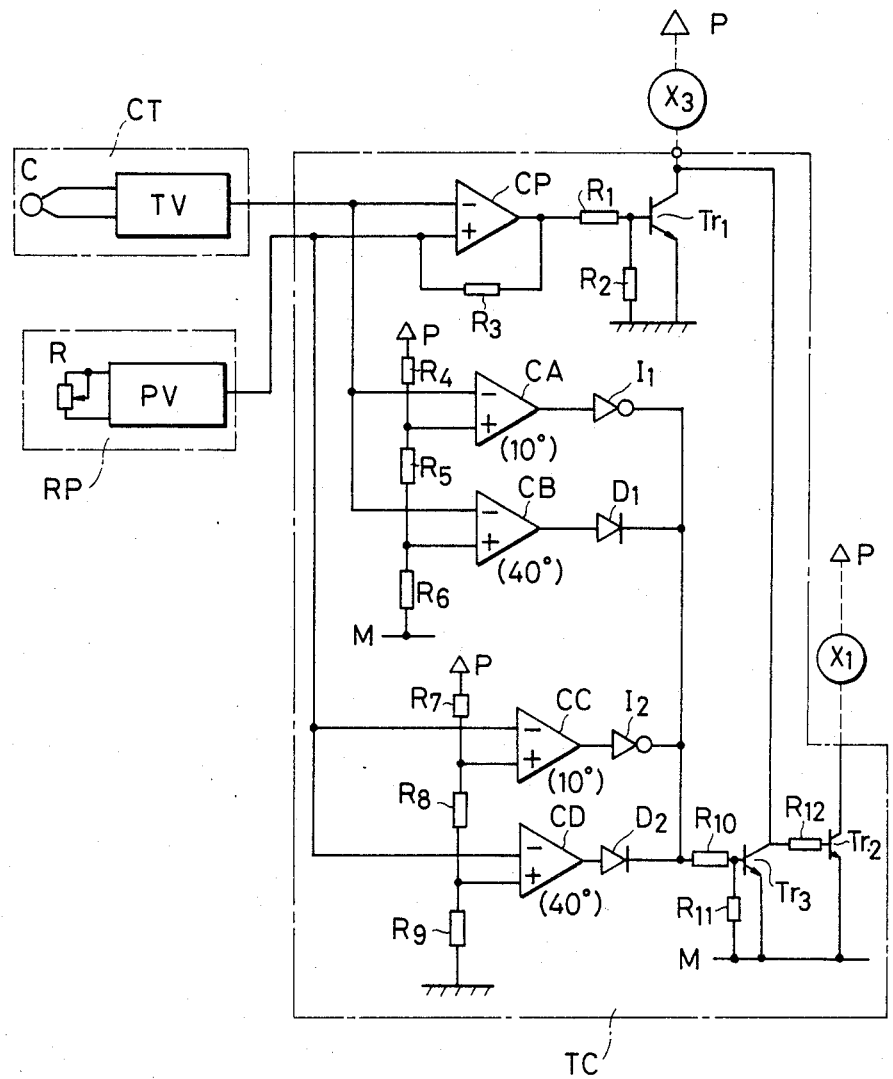
FIG. 5 is an electrical circuit diagram of a temperature controller of the control device of the present invention.

FIG. 5 shows a detailed electrical circuit diagram of the temperature controller TC of FIG. 4. In FIG. 5, CT is a temperature sensor circuit consisting of a temperature detecting sensor C and a converter circuit TV which converts an output signal from the sensor C into a voltage, RP is a temperature setting circuit consisting of a variable transistor unit R and a converter circuit PV to convert an output signal from the unit R to a voltage. CP, CA, CB, CC and CD are all comparators consisting of operational amplifiers for comparing two (2) input signals. R1 through R12 are resistors, and Tr1, Tr2, and Tr3 are transistors.

The plus terminal of the comparator CP is supplied with a voltage from the converter PV which corresponds to the temperature setting value. The minus terminal is supplied with a voltage corresponding to a detected temperature value from the converter TV according to a resistance value of the sensor C.

When a thermistor is used for the temperature sensor C, the resistance value of the thermistor increases as the temperature decreases. In this case, a high voltage is provided by the converter TV and a voltage from the comparator CP is low if the voltage at its negative terminal is higher than the voltage at the plus terminal. On the contrary, the resistance value of the thermistor C is small if the temperature is high. In this case, a relatively low voltage is outputted by the converter TV and a voltage from the comparator CP is high to cause the transistor Tr1 to be conductive. The relay X3 is magnetized to close the contact X3A (FIG. 4) thereby enabling the fan motor FM to circulate air around the cooler 7.

Figure 6:
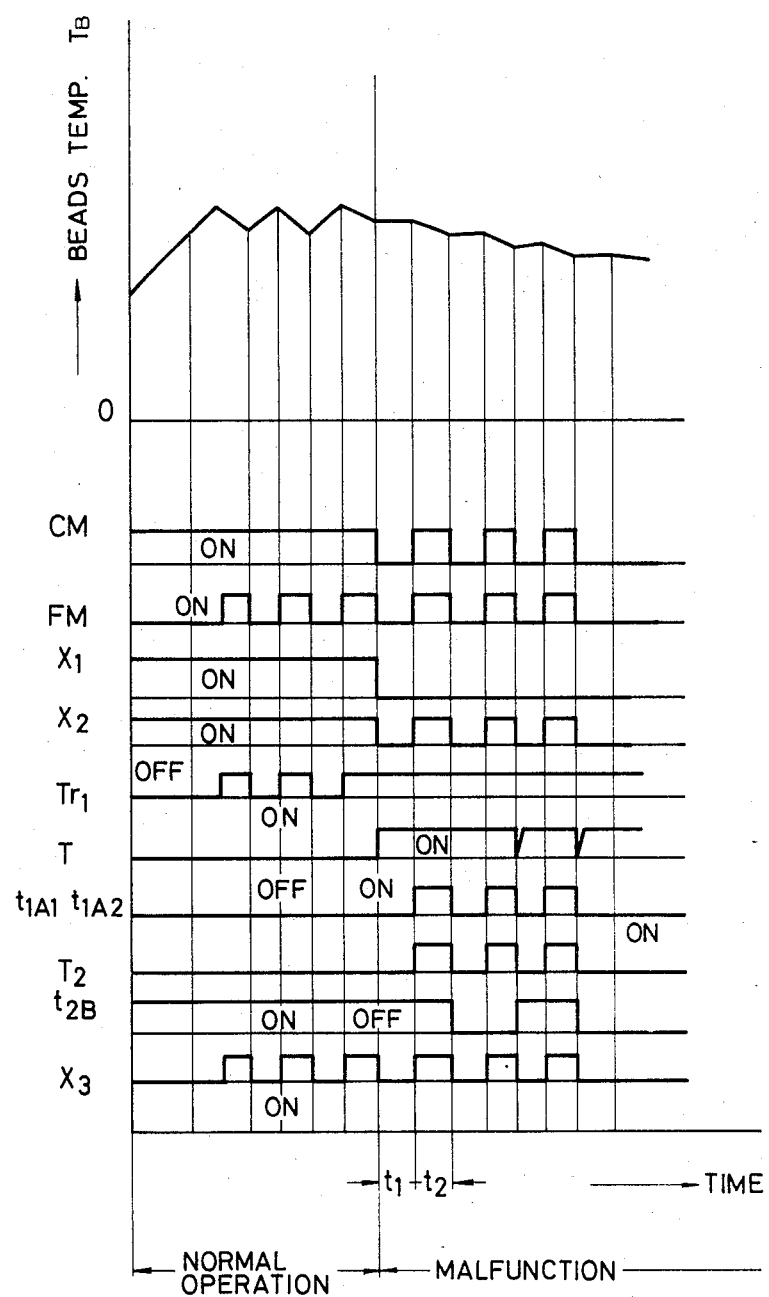
FIG. 6 is a timing diagram for illustrating the operation of the circuit of FIG. 4.

The bead temperature goes down as shown as TB in FIG. 6 because cooled, compressed air from the compressor 6 cools the air chamber, This temperature drop gradually increases the resistance value of the thermistor C, and the voltage of the converter CP also increases gradually. The voltage from the comparator CP is inverted and becomes low-level at the point where the voltage becomes higher than the reference voltage at the plus terminal. Then the transistor Tr1 turns off and the fan motor FM stops.

The resistor R3 is included for the purpose of hysteresis. That is, the voltage from the comparator CP is not switched from low to high immediately even if the temperature gradually increases due to the stoppage of the fan motor FM or due to other reasons. The voltage from the comparator CP can be switched only when the voltage from the converter TV reaches a low voltage value having a slight voltage difference with respect to the reference voltage.

The plus terminal of the comparator CA is generally given a reference voltage from the DC power source P through the resistor R4 corresponding to a temperature lower than the desirable temperature determined by the temperature setting unit R (10° C. for example). On the other hand, a reference voltage corresponding to a temperature higher than the desirable temperature (40° C., for example) is applied through the resistors R4 and R5 to the plus terminal of the comparator CB. A voltage from the converter TV is applied to the minus terminal of the comparator CA.

If the sensor circuit (sensor C and converter TV) becomes defective and the sensor circuit CT outputs a voltage corresponding to a temperature less than 10° C., a voltage higher than the voltage at the plus terminal is applied to the minus terminal. The voltage which is normally high is inverted to a low voltage to cause the inverter I1 to output a high-level voltage. When the sensor circuit CT outputs a voltage corresponding to a temperature higher than 40° C., the comparator CB receives at its minus terminal a voltage lower than the reference voltage. The comparator CB generate a high output through the diode D1.

A reference voltage corresponding to a temperature lower than the desirable temperature (10° C. for example) is applied to the plus terminal of the comparator CC, while a reference voltage corresponding to a temperature higher than the desirable temperature is applied to the plus terminal of the comparator DC. The voltage from the temperature setting circuit RP is applied to the minus terminals of the comparators CC and CD. If the voltage from the temperature setting circuit RP is lower than a voltage corresponding to 10° C. due to a fault or wrong setting by the setting circuit RP, then a high-level voltage is sent from the comparator CC via the inverter I2. Where the voltage is higher than a voltage corresponding to 40° C., then a high-level voltage is sent from the comparator CD.

Thus, the temperature controller circuit TC is available for use in the case of a malfunction of the sensor circuit CT or the temperature circuit RP. In case of such malfunction, one of the comparators CA, CB, CC, and CD will operate and a high-level voltage will be applied to turn the transistor Tr3 on. The transistor Tr2 is turned off, and the relay X1 is demagnetized. Consequently, the relay X1 is demagnetized or deenergized if fault occurs in the temperature controller TC.

Referring to FIGS. 4 through 6, the operation of the second embodiment of the present invention is as follows. While the temperature controller TC is operating and the temperature of the beads is within a temperature range from 10° C. to 40° C., the relay X1 is magnetized. The relay X2 remains magnetized and the contact X2A remains on. Therefore, the compressor motor CM is in continuous operation and the relay X3 works to run and stop the fan motor FM repeatedly because the temperature controller TC causes the transistor Tr1 to be turned on or off repeatedly. Cooling of the compressed air to be fed from the compressor 6 to the tank 2 is performed according to the temperature of the beads. The beads in the tank 2 move continuously and the bead temperature is maintained at approximately the predetermined temperature, 30° C. for example.

Assuming that the voltage from the sensor circuit CT and the temperature setting circuit RP deviate from the temperature range of 10° C. through 40° C., the transistor Tr3 immediately turns on and the transistor Tr2 turns off. The relay X1 is demagnetized to cause the contact X1A to be off, and the relays X2 and X3 are open. As a result, the compressor motor CM and the fan motor FM no longer receive power. The timer T1 is energized to start time counting. Upon completion of timer counting, the contacts t1A1 and t1A2 are turned on to cause the timer T2 to be energized.

The transistor Tr3 remains on and the relays X2 and X3 remain magnetized for a period between the completion of counting of the timer T1 and the timer T2. Therefore, the compressor motor CM and the fan motor FM run and cooled, compressed air cause beads to move around in the tank 2.

Assuming that t1 is the period of time that no power is supplied to the relays X2 and X3 and that t2 is the period of time that power is supplied to the relays X2 and X3, a ratio of the intermittent operation of the compressor motor CM is expressed by $t2/(t1+t2)$. The bead temperature generally goes down during t1 because the compressor motor CM is not operating. When the timer T2 completes counting, the contact t2B is off, the timer T1 is deenergized, and the contacts t1A1 and t1A2 are closed. When the timer T2 is deenergized, the contact t2B is immediately turned on again. Therefore, the timer T1 is energized to again start time counting. Upon the completion of time counting by the timer T1, the contacts t1A1 and t1A3 are again closed. With the adjustment of the periods of t1 and t2, it is possible to prevent a bead temperature rise and to keep the temperature almost constant by repeating the operations as explained above.

In accordance with the present invention, it is possible to minimize an adverse influence given to a patient even in the case of a malfunction of the temperature controller TC by a failure of the sensor C or the temperature set unit C. During intermittent operation, the movement of beads can be assured by the intermittent operation of the compressor motor CM. It is also possible to keep the bead temperature substantially constant and to avoid an excessive temperature rise with the intermittent operation of the cooler.

It should be understood that the present invention is not limited to the particular embodiments described, but rather is susceptible to modifications, alterations, and equivalent arrangement within the scope of the appended claims.

What is claimed is:

1. In a hospital bed having a bed-mat containing bead-like particles, a compressor motor for driving a compressor that supplies compressed air for suspending and circulating the particles within the bed-mat, and a cooler for cooling the compressed air to be supplied to the bed-mat, a control device comprising:
   a first temperature sensor for detecting the temperature of said particles and for generating a first output signal having a first value when the temperature of said particles exceeds a maximum level and a second value when the temperature of the particles does not exceed said maximum level;
   means for continuously operating said compressor motor and intermittently operating said cooler in response to said second value of said first output signal; and
   means for controlling said operating means to operate said cooler and said compressor motor simultaneously and intermittently in response to said first value of said first output signal.

2. A control device according to claim 1, wherein said operating means comprises:
   an electrical power supply;
   a second temperature sensor for detecting the temperature of said particles and for generating a second output signal having a first value when the temperature of said particles exceeds a base level and a second value when the temperature of said particles does not exceed said base level;
   a first switch means for supplying power from said power supply to said cooler and said compressor motor when said first output signal has said second value;
   a second switch means for enabling the operation of said compressor motor;
   a third switch means for enabling the operation of said cooler; and a temperature controller for controlling said second switch means to continuously operate said compressor motor responsive to said second value of said first output signal and for controlling said third switch means to operate said cooler responsive to said first value of said second output signal.

3. A control device according to claim 2, wherein said controlling means comprises:
a timing means for controlling said second switch means to disable the operation of said compressor motor during a first time period and to enable the operation of said compressor motor during a second time period; and
a fourth switch means responsive to said first value of said first output signal for enabling the operation of the said timing means.

4. A control device according to claim 3, wherein said timing means comprises:
means for controlling said third switch means to disable the operation of said cooler during said first time period and for enabling the operation of said cooler during said second time period.

5. A control device according to claim 4, wherein said timing means comprises:
a first timer for generating a first timing signal after a delay corresponding to said first time period; and
a second timer for generating a second timing signal after a delay corresponding to said second time period, said first timing signal being supplied to said second timer for initiating the operation thereof and said second timing signal being supplied to said first timer for initiating the operation thereof.

6. A control device according to claim 5, wherein said first, second, and third switch means comprise relays.

7. In a hospital bed having a bed-mat containing bead-like particles, a compressor motor for driving a compressor that supplies compressed air for suspending and circulating the particles within the bed-mat, and a cooler for cooling the compressed air to be supplied to the bed-mat, a control deice comprising:
a temperature sensor for outputting an actual temperature signal having a level corresponding to the temperature of said particles;
a normal operation reference signal generator for outputting a normal reference signal having a level corresponding to a desired temperature for said particles;
a first switch means for enabling the operation of said compressor motor;
a second switch means for enabling the operation of said cooler; and
a temperature controller (1) for controlling said first switch means to enable the operation of said compressor motor when said actual temperature signal and said normal reference signal have respective levels within predetermined limits, (2) for controlling said second switch means to enable the operation of said cooler when said actual temperature signal and said normal reference signal have respective levels within said predetermined limits and said level of said actual temperature signal exceeds said level of said normal reference signal, and (3) for controlling said first switch means and said second switch means to simultaneously disable and then simultaneously enable the operation of said compressor motor and said cooler, respectively, when at least one of said actual temperature signal and said normal reference signal has respective levels outside of said predetermined limits.

8. A control device according to claim 7, wherein said temperature controller comprises:
a first comparator for comparing the levels of said actual temperature signal and said normal reference signal and for generating a first output having a first value when said level of said actual temperature signal exceeds said level of said normal reference signal and a second value when said level of said actual temperature signal does not exceed the level of said normal reference signal, said first value of said first output signal controlling said second switch means to enable the operation of said cooler;
a second comparator for comparing said level of said actual temperature signal to an upper limit level and a lower limit level defining said predetermined limits and for generating a second output signal with said first value when said level of said actual temperature signal is above said upper limit level or said lower limit level and said second value when said level of said actual temperature signal is within said upper limit level and said lower limit level; and
a third comparator for comparing said level of said reference temperature signal to said upper limit level and said lower limit level and for generating said second output signal with said first value when said level of said reference temperature signal is within said upper limit level and said lower limit level.

9. A control device according to claim 8, further comprising:
a first timer, responsive to said second output signal having said first value, for generating a first timing signal for a first time period, said first timing signal for controlling said first switch means and said second switch means to disable the operation of said compressor motor and said cooler, respectively, for a period corresponding to said first time period; and
a second timer, responsive to the termination of said first timing signal, for generating a second timing signal for a second time period, said second timing signal for controlling said first switch means and said second switch means to enable the operation of said compressor motor and said cooler, respectively, for a period corresponding to said second time period.

10. A control device according to claim 9, wherein said first switch means and said second switch means comprise relays.

* * * * *